UNITED STATES PATENT OFFICE.

MILTON F. BEECHER, OF WORCESTER, MASSACHUSETTS, ASSIGNOR TO NORTON COMPANY, A CORPORATION OF MASSACHUSETTS.

ANTISLIPPING VITRIFIED TILE.

1,377,957. Specification of Letters Patent. Patented May 10, 1921.

No Drawing. Application filed April 29, 1918. Serial No. 231,546.

*To all whom it may concern:*

Be it known that I, MILTON F. BEECHER, a citizen of the United States of America, residing at Worcester, in the county of Worcester and State of Massachusetts, have invented certain new and useful Improvements in Antislipping Vitrified Tiles, of which the following is a full, clear, and exact specification.

My invention relates to anti-slipping or safety treads and more particularly to ceramic tile having incorporated therein a quantity of exceedingly hard granular material adapted to give the tile a rough surface, capable of resisting footwear and preventing slipping thereon.

It has been proposed to bond together particles of hard, wear resisting material, such as previously fused alumina, with a glass fusing ceramic clay bond. This type of tile involves a large amount, approximately 80%, of expensive alumina combined with a small proportion of inexpensive ceramic material, and the latter is not adapted or intended to be exposed to footwear any more than is necessary, as its function is merely that of a bond to hold the wear resisting granules together.

It moreover is often desirable to develop decorative effects in the tiles, but this is difficult in the glassy bonded articles heretofore proposed because the bond is normally a deep red brown and is therefore not colored easily and because the exposed surface of such a tile is made up almost wholly of the ordinarily dark colored granular alumina. On the other hand, a vitrified bond is more easily colored and kept clean, especially if the anti-slipping grain does not make up too much of the surface.

It is accordingly an object of my invention to produce a tile for safety treads which is essentially anti-slipping, and which is just wear-resistant enough to cause this property to be retained throughout its life; which is made of such a composition that slagging or fusion of the bond is not necessary in order to produce the qualities desired; which has a dense and durable body of low porosity and which has a sufficiently low content of the anti-slipping, wear-resistant granules combined with a suitable bond to produce a low-priced, easily colored, uniformly shaped block or tile of distinct decorative qualities.

With these and other objects in view as will be apparent from the following disclosure I have accordingly produced an anti-slipping, wear-resistant ceramic body; which has incorporated in it as the essential and all important ingredient a specified quantity of hard, anti-slipping granular material, such as crushed fused alumina, of certain grit sizes, which grits are bonded together into a unitary body by a vitrified composition of the type of porcelain which is not slagged in the firing of the tile nor fused to a glass. The preferred composition of my tile involves a vitrifying clay material with which is uniformly incorporated a granular material of the hardness of 9 or more, the amount of the latter and the grit sizes being such as will give desirable anti-slipping and wear-resisting characteristics to the tile.

In such a construction it is essential that the ceramic material forming the tile body be hard, durable and wear resistant in itself since the granules embedded therein do not constitute the whole exposed surface area and a certain amount of wear will fall directly upon the ceramic substance. I have found that a dense burning vitrifying clay material which vitrifies within the ordinary temperature range of the ceramic industry is well adapted for this purpose and I ordinarily utilize a porcelain body composition, or I may use a straight clay or make various minor additions thereto, such as are suitable for forming a vitrified body.

As a straight clay, I utilize a ball clay and prefer that variety known as Mississippi ball clay. However, as the best vitrifying clays are not easily obtainable and frequently present problems in handling and manufacturing, I may alter the vitrifying properties of the clay so as, for example, to reduce its shrinkage, make drying easier, and so forth, by the addition of such substances as feldspar, talc, steatite, whiting, flint, boneash or Cornwall stone. For instance, feldspar tends to lower the vitrifying point of the mass and hence the burning temperature, while steatite has the property of rendering the ceramic tougher and more durable, although it renders the kiln treatment more difficult to control. By varying the proportions of the various ingredients, I am enabled to produce tiles of different characteristics, as desired.

I find that, owing to the whiteness of the product, the ease with which it may be colored and its durability under wear, a porcelain is especially desirable for my purposes. One example of a porcelain composition which is especially satisfactory is made up as follows:

Ball clay ---------------- 35 parts by weight.
Feldspar ---------------- 25 parts by weight.
Flint -------------------- 40 parts by weight.

For the anti-slipping material I preferably utilize granular substances of a hardness of 9 or more on Moh's scale and which have the necessary durability under the abrading action of footwear. Softer substances wear away too rapidly for use where traffic conditions are severe or do not possess the necessary frictional qualities and ability to cut into and hold firmly whatever material footgear may be made of. Suitable materials include previously molten or crystalline alumina, such as electrically fused alumina and the different types of corundum, and silicon carbid, but I prefer to employ previously molten alumina because of its ability to withstand the shocks and breaking strains to which a tread is subjected. The natural substances, such as the impure forms of corundum known as emery, contain varying degrees of unserviceable impurities, depending upon the locality from which the crystalline alumina is derived, and, while suitable for certain types of tread surface and within the scope of my invention, are inferior to the electrically fused aluminous materials artificially prepared to contain known ingredients in desired proportions and of required physical characteristics. While larger or smaller amounts of alumina may obviously be used, depending upon the kind of wear to which the tread may be subjected, I find that a safe tread may be made by having the alumina less in amount than that of the vitrified material. However, to provide a good anti-slipping surface, the grains must constitute a considerable portion of the tread surface, or at least 20% by weight of the mass. A particularly satisfactory tread is one containing from 30% to 40% by weight of alumina, crushed to grit sizes which will give desired anti-slipping properties. Although various sizes may be utilized, I find that grits passing a 20 mesh sieve and retained on a 46 mesh are best suited for stair treads.

It has been found by experiment to be very important that the finished tile have just the proper hardness and toughness. If the composite hardness is too great the tile will glaze under foot traffic and become slippery irrespective of the kind or quantity of hard granular material present. On the other hand if deficient in composite hardness the anti-slip quality will still be present but the product will not be wear-resistant. The limits of composition here disclosed take account of these two facts and the resulting product meets both conditions of being wear-resistant and anti-slipping. Assuming that the porcelain composition above specified is used, two parts of ball clay, feldspar and flint in the proportions given are mixed with one part of alumina and a suitable amount of water to form a mass which may be cast or molded. Owing to the nature of the ceramic clay material, pressure need not be applied, unless desired, to form the tile shape. After drying, the tile is burned at a heat sufficient to vitrify but not fuse the mass, which for the materials selected is approximately 1300° C. The firing is continued for about 100 hours, after which the article should be cooled slowly for a similar length of time. The temperature of burning is so controlled that the clay material does not become fluid or soften sufficiently to deform or warp the tile to a detrimental extent. The vitrification, on the other hand, is carried on sufficiently to burn the tile to a dense, compact mass having small porosity and a low absorption, ordinarily not over 3%. Various methods well known to ceramists may obviously be employed to manufacture this article. The tile may be colored as desired by adding various coloring materials to the clay mass before burning the tile, this being carried on by well known operations. For example, to produce a blue colored article one may add the black oxid of cobalt to the clay materials. The tile may be made in desirable shapes for use in regular patterns or in terrazzo floors, but preferably in the form of thin, flat plates, having a rectangular top surface which is continuous and lies in one plane. It may be fastened to a flooring, walk, stair tread and so forth, by suitable means such as screws or by embedding in concrete or other plastic setting material in geometrical shapes and patterns or irregularly shaped and positioned as terrazzo flooring.

In this way, I form a vitrified ceramic body containing a hard and permanently anti-slipping material, which is durable, highly resistant to prolonged footwear, sufficiently non-porous and impervious to moisture to be sanitary and easily cleaned, which is capable of being colored as desired in manufacture and is not subject to unreasonable warpage or distortion in the kiln or to high kiln losses and which utilizes a relatively large amount of easily obtainable ceramic bond material and a minimum of the grit or non-slip content.

I claim as my invention:—

1. A ceramic article for a safety tread, comprising a body having a rough tread surface of durable, wear-resisting, vitrified non-glassy clay material and anti-slipping granular material of a hardness of 9 or more intimately incorporated therein and forming a considerable portion of the surface to prevent a pedestrian slipping thereon.

2. An anti-slipping tread comprising a hard, durable, vitrified, non-glassy ceramic body of low porosity having anti-slipping granular material of a hardness of 9 or more incorporated therein and forming a considerable portion of its tread surface, said surface being anti-slipping and continuous to prevent a pedestrian slipping thereon.

3. A ceramic tile comprising a unitary, dense, compact, wear-resisting body of porcelain material and granular abrasive material of a hardness of 9 or more embedded in and projecting from the tread surface of the porcelain in sufficient amount to render the tile anti-slipping for pedestrians.

4. A ceramic article for a safety tread comprising a vitrified, non-glassy, densely burned ceramic body and anti-slipping granules of crystalline alumina incorporated in said body and forming a considerable portion of the tread surface to prevent slipping thereon.

5. A ceramic article for safety treads comprising a body of vitrified clay material and anti-slipping granules of crystalline alumina incorporated in and projecting from the surface thereof, said vitrified material constituting the major part of the total volume and the anti-slipping granules forming a considerable portion of the tread surface and being capable of preventing a pedestrian slipping thereon.

6. A ceramic tile comprising a unitary, dense, compact and wear resisting body of porcelain material intimately associated with an amount of previously fused alumina grain which is less than that of the porcelain, but which renders the surface anti-slipping and resistant to footwear.

7. A ceramic article for treads comprising a vitrified, non-glassy, ceramic body and at least 20% by weight of anti-slipping granular material of a hardness of 9 or more incorporated in the porcelain and forming an anti-slipping tread surface therefor.

8. A ceramic article comprising a porcelain body and anti-slipping granules of crystalline alumina incorporated therein, said granules constituting from 20% to 50% by weight of the total mass and forming a wear-resisting safety tread surface.

9. A ceramic tread comprising crystalline alumina granules incorporated in a vitrified body of ball clay, feldspar and flint, said granules constituting from 20% to 40% by weight of the total mass.

10. A ceramic article for treads, comprising a burned clay body containing coloring material and granular wear-resisting material of extreme hardness forming a considerable portion of the surface to prevent a pedestrian slipping thereon.

11. As a ceramic article for treads, a porcelain body containing coloring material and crystalline alumina granules which render the surface wear-resistant and anti-slipping for pedestrians.

12. In an article for safety treads, a vitrified ceramic body containing coloring material and at least 30 per cent. by weight of crystalline alumina material which renders the tread wear-resistant and anti-slipping.

Signed at Worcester, Massachusetts, this 26th day of April, 1918.

MILTON F. BEECHER.